(12) United States Patent
Fujimoto (10) Patent No.: US 9,575,313 B2
(45) Date of Patent: Feb. 21, 2017

(54) OPTICAL DEFLECTOR INCLUDING MIRROR WITH EXTENDED REINFORCEMENT RIB COUPLED TO PROTRUDED PORTIONS OF TORSION BAR

(71) Applicant: STANLEY ELECTRIC CO., LTD., Meguro-ku, Tokyo (JP)

(72) Inventor: Kenjiro Fujimoto, Tokorozawa (JP)

( * ) Notice: Subject to any disclaimer, the term of this patent is extended or adjusted under 35 U.S.C. 154(b) by 0 days.

(21) Appl. No.: 15/049,331

(22) Filed: Feb. 22, 2016

(65) Prior Publication Data

US 2016/0274354 A1    Sep. 22, 2016

(30) Foreign Application Priority Data

Mar. 16, 2015    (JP) .................... 2015-051862

(51) Int. Cl.
   *G02B 26/08*    (2006.01)
   *G02B 26/10*    (2006.01)
(52) U.S. Cl.
   CPC ....... *G02B 26/101* (2013.01); *G02B 26/0833* (2013.01); *G02B 26/0858* (2013.01)
(58) Field of Classification Search
   CPC .... G02B 26/08; G02B 26/085; G02B 26/101; G02B 26/0833; G02B 26/0858; H02K 33/00
   USPC ....... 359/202.1, 200.7, 290, 291, 872, 212.1
   See application file for complete search history.

(56) References Cited

U.S. PATENT DOCUMENTS

| | | | |
|---|---|---|---|
| 8,654,426 B2* | 2/2014 | Yamada | G02B 26/0858 359/212.1 |
| 2012/0162739 A1 | 6/2012 | Yamada | |
| 2014/0071512 A1 | 3/2014 | Ikegami | |
| 2014/0268271 A1 | 9/2014 | Tani | |
| 2014/0327946 A1 | 11/2014 | Van Lierop et al. | |
| 2016/0006330 A1 | 1/2016 | Fujimoto | |

FOREIGN PATENT DOCUMENTS

| | | |
|---|---|---|
| EP | 2781948 A1 | 9/2014 |
| EP | 3021155 A1 | 5/2016 |
| JP | 2010128116 A | 6/2010 |
| WO | 2014122781 A1 | 8/2014 |
| WO | 2015004710 A1 | 1/2015 |

OTHER PUBLICATIONS

Extended European Search Report dated Jul. 13, 2016, issued in counterpart European Application No. 16157099.9.

* cited by examiner

*Primary Examiner* — Euncha Cherry
(74) *Attorney, Agent, or Firm* — Holtz, Holtz & Volek PC (57) ABSTRACT

An optical deflector includes a mirror with a reflective layer on its front-side surface, a first support frame adapted to support the mirror, at least one torsion bar coupled between the first support frame and the mirror; and a reinforcement rib provided on a rear-side surface of the mirror. The torsion bar has a pair of protruded portions arranged symmetrically with respect to the torsion bar in the vicinity of a coupling portion between the torsion bar and the mirror. The reinforcement rib has a central portion and a pair of extension portions extended symmetrically from the central portion and coupled to the protruded portions, respectively, of the torsion bar.

10 Claims, 9 Drawing Sheets

OPTICAL DEFLECTOR INCLUDING MIRROR WITH EXTENDED REINFORCEMENT RIB COUPLED TO PROTRUDED PORTIONS OF TORSION BAR

This application claims the priority benefit under 35 U. S. C. §119 to Japanese Patent Application No. JP2015-051862 filed on Mar. 16, 2015, which disclosure is hereby incorporated in its entirety by reference.

BACKGROUND

Field

The presently disclosed subject matter relates to an optical deflector used in an optical scanner for a projector, a laser headlamp, a bar code reader, a laser printer, a laser head amplifier, a head-up display unit and the like.

Description of the Related Art

Recently, optical deflectors used in optical scanners have been micro electro mechanical system (MEMS) devices manufactured by semiconductor manufacturing technology and micro machine technology.

A first prior art optical deflector is constructed by a mirror supported by torsion bars to a support frame. Also, provided between the support frame and the torsion bars are actuators serving as cantilevers. Thus, the mirror can be rocked around an axis by the actuators.

In the above-described first prior art optical deflector, since the thickness of the mirror is the same as that of the torsion bars, the mirror is very thin. Therefore, the moment of inertia of the mirror is so small that the resonant frequency of the mirror is very large. As a result, the mirror can be driven at a higher speed than a required speed.

Figure 5A:
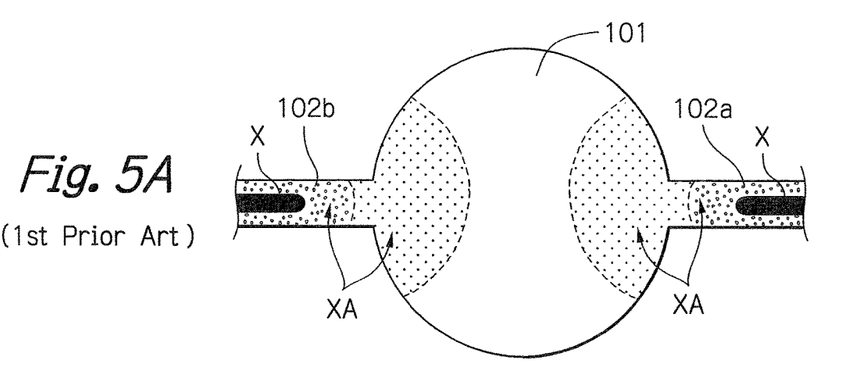
FIG. 5A is a rear-side view of a mirror and torsion bars of the first prior art optical deflector with a simulated stress distribution.

In the first prior art optical deflector, however, since the mirror is very thin, the rigidity of the mirror is very small. Therefore, when the rocking angle of the mirror is large, a relatively large stress as a repulsive force would be spread isotropically and broadly into the mirror from the torsion bars (see: FIG. 5A). As a result, the entire mirror would be greatly deformed in a bowl shape, so that the dynamic face-deflection peak-to-valley amount would be very large. Thus, the optical scanning characteristics of reflected light of the mirror would not satisfy the required optical scanning characteristics in optical scanners for high definition projectors. At worst, the mirror entirely would break down. Note that the required dynamic face-deflection peak-to-valley amount is defined by one-tenth of a wavelength ($\lambda$=450 nm) of a laser beam irradiated onto the mirror.

A second prior art optical deflector is further constructed by a ring-shaped reinforcement rib provided on a rear surface of the mirror of the first prior art optical deflector. In this case, the size of the ring-shaped reinforcement rib is smaller than that of the mirror. Therefore, the substantial thickness of the mirror is larger than that of the torsion bars (see: FIG. 11 of US2014/0071512A1).

Figure 5B:
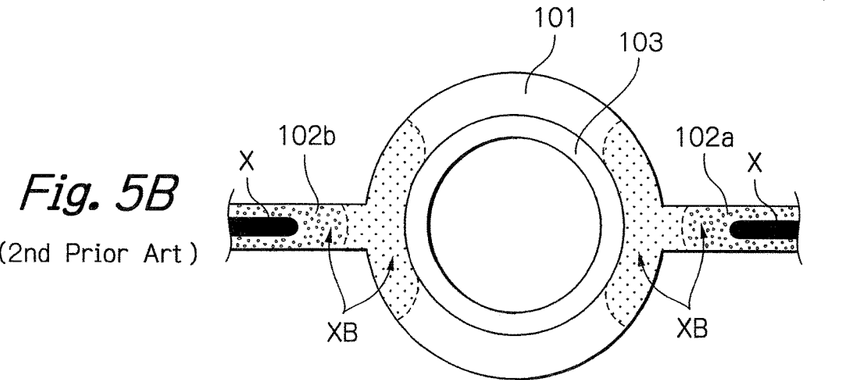
FIG. 5B is a rear-side view of a mirror and torsion bars of the second prior art optical deflector with a simulated stress distribution.

In the above-described second prior art optical deflector, due to the presence of the ring-shaped reinforcement rib, the rigidity of the mirror is larger than that of the mirror of the first prior art optical deflector. Therefore, when the rocking angle of the mirror is large, a relatively large stress as a repulsive force spread from the torsion bars into the mirror would be interrupted by the ring-shaped reinforcement rib (see: FIG. 5B). In other words, no substantial stress occurs in a central portion of the mirror within the ring-shaped reinforcement rib. As a result, the dynamic face-deflection peak-to-valley amount of the mirror is smaller than that of the first prior art optical deflector.

In the above-described second prior art optical deflector, however, the above-mentioned relatively large stress would still broadly spread into portions of the mirror between the torsion bars and the ring-shaped reinforcement rib. Therefore, the portions of the mirror between the torsion bars and the ring-shaped reinforcement rib would be distorted, so that the optical scanning characteristics of reflected light from the mirror would still deteriorate. Additionally, the ring-shaped reinforcement rib would be peeled off.

In a third prior art optical deflector, protruded portions are provided at the mirror of the second prior art optical deflector along a rocking direction in the vicinity of a coupling portion between the mirror and the torsion bars, and extension portions of the reinforcement rib are coupled to the protruded portions of the mirror (see: WO2014/122781A1).

Figure 5C:
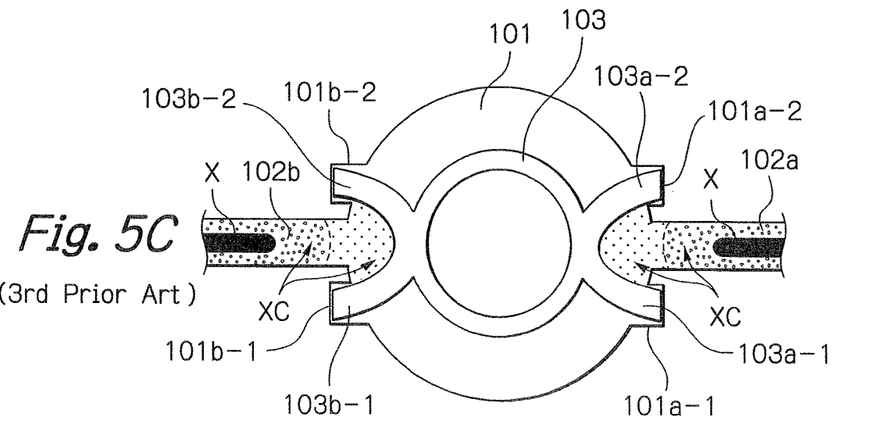
FIG. 5C is a rear-side view of a mirror and torsion bars of the third prior art optical deflector with a simulated stress distribution.

In the above-described third prior art optical deflector, due to the presence of the extension portions of the ring-shaped reinforcement rib, the rigidity of the mirror is larger than that of the mirror of the second prior art optical deflector. Therefore, when the rocking angle of the mirror is large, a relatively large stress as a repulsive force spread from the torsion bars into the mirror would also be interrupted by the extension portions of the ring-shaped reinforcement rib (see: FIG. 5C). In other words, no substantial stress occurs in portions of the mirror beyond the extended ring-shaped reinforcement rib in addition to the central portion of the mirror. As a result, the dynamic face-deflection peak-to-valley amount of the mirror is smaller than that of the second prior art optical deflector.

In the above-described third prior art optical deflector, however, the above-mentioned relatively large stress would still spread into portions of the mirror surrounded by the extension portions of the ring-shaped reinforcement rib. Therefore, the portions of the mirror surrounded by the extension portions of the ring-shaped reinforcement rib would be distorted, so that the optical scanning characteristics of reflected light from the mirror would still deteriorate. Additionally, the ring-shaped reinforcement rib would be peeled off.

SUMMARY

The presently disclosed subject matter seeks to solve one or more of the above-described problems.

According to the presently disclosed subject matter, an optical deflector includes a mirror, a mirror with a reflective layer on its front-side surface, a first support frame adapted to support the mirror, at least one torsion bar coupled between the first support frame and the mirror, and a reinforcement rib provided on a rear-side surface of the mirror. The torsion bar has a pair of protruded portions arranged symmetrically with respect to the torsion bar in the vicinity of a coupling portion between the torsion bar and the mirror. The reinforcement rib has a central portion and a pair of extension portions extended symmetrically from the central portion and coupled to the protruded portions, respectively, of the torsion bar.

Thus, according to the presently disclosed subject matter, when the rocking angle of the mirror is large, although a relatively large stress as a repulsive force spread from the torsion bar is concentrated at a portion of the torsion bar in the vicinity of the protruded portions thereof, no substantial stress occurs in a portion of the mirror surrounded by the extension portions of the reinforcement rib. Therefore, the portion of the mirror surrounded by the extension portions reinforcement rib would not be distorted, i.e., the entire mirror would not be distorted, so that the optical scanning characteristics of reflected light from the mirror would improve. Additionally, the ring-shaped reinforcement rib would not be peeled off.

BRIEF DESCRIPTION OF THE DRAWINGS

The above and other advantages and features of the presently disclosed subject matter will be more apparent from the following description of certain embodiments, taken in conjunction with the accompanying drawings, as compared with the prior art, wherein.

DETAILED DESCRIPTION OF EXEMPLARY EMBODIMENTS

Figure 1:
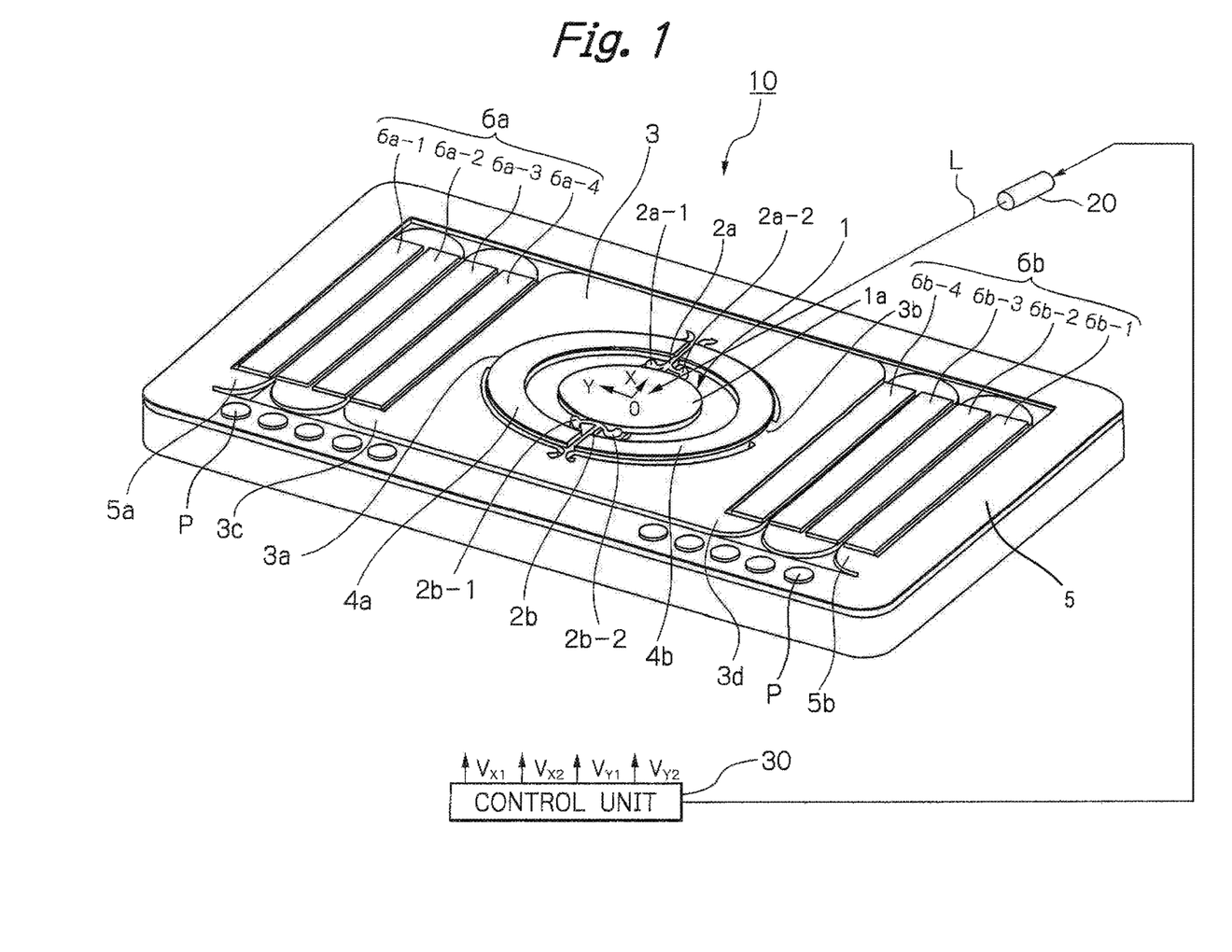
FIG. 1 is a front-side perspective view illustrating an embodiment of the two-dimensional optical deflector according to the presently disclosed subject matter.

In FIG. 1, which illustrates an embodiment of the two-dimensional optical deflector according to the presently disclosed subject matter, reference numeral 10 designates a two-dimensional optical deflector, 20 designates a laser light source, and 30 designates a control unit for controlling the optical deflector 10 and the laser light source 20.

The optical deflector 10 is constructed by a circular mirror 1 with a reflective layer 1a on its front surface for reflecting incident light L from the laser light source 20, a pair of torsion bars 2a and 2b coupled to the mirror 1 along an X-axis, an inner frame (movable support frame) 3 surrounding the mirror 1 and the torsion bars 2a and 2b for supporting the mirror 1, a semi-ring shaped inner piezoelectric actuator 4a coupled between the torsion bars 2a and 2b and supported by an inner coupling portion 3a of the inner frame 3, and a semi-ring shaped inner piezoelectric actuator 4b coupled between the torsion bars 2a and 2b and supported by an inner coupling portion 3b of the inner frame 3. In this case, the inner frame 3 has a circular inner circumference along the inner piezoelectric actuators 4a and 4b, and a rectangular outer circumference. The flexing direction of the inner piezoelectric actuator 4a is opposite to that of the inner piezoelectric actuator 4b, so that the inner piezoelectric actuators 4a and 4b serve as cantilevers for rocking the mirror 1 around the X-axis.

Also, the optical deflector 10 includes an outer frame (fixed support frame) 5 and a pair of meander-type outer piezoelectric actuators 6a and 6b coupled between coupling portions 5a and 5b of the outer frame 5 and outer coupling portions 3c and 3d of the inner frame 3 and serving as cantilevers for rocking the mirror 1 around a Y-axis on the plane of the mirror 1 centered at the center O of the mirror 1. The outer piezoelectric actuators 6a and 6b are arranged opposite to each other with respect to the mirror 1.

The mirror 1 can be square, rectangular, polygonal or elliptical. In this case, the inner-circumference of the inner frame 3 is adapted to the shape of the mirror 1.

Figure 2A:
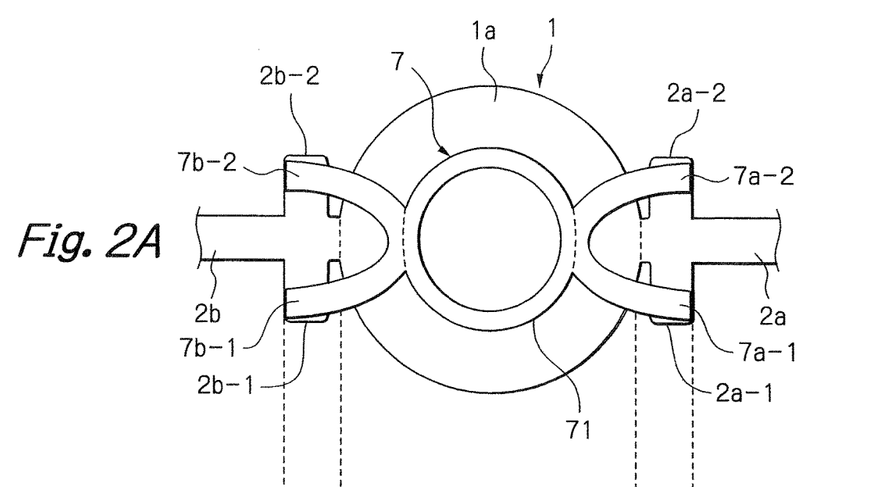
FIG. 2A is a rear-side view of the mirror and torsion bars of FIG. 1.
Figure 2B:
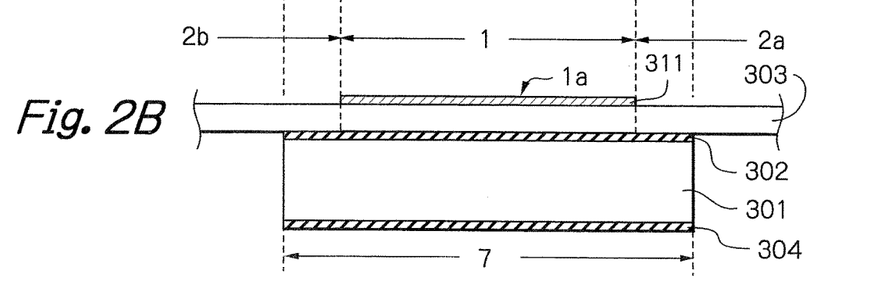
FIGS. 2B and 2C are cross-sectional views of FIG. 2A.

Referring to FIGS. 2A and 2B, in addition to FIG. 1, protruded portions 2a-1 and 2a-2 are provided symmetrically at both sides of the torsion bar 2a in the vicinity of a coupling portion between the mirror 1 and the torsion bar 2a, and protruded portions 2b-1 and 2b-2 are provided symmetrically at both sides of the torsion bar 2b in the vicinity of a coupling portion between the mirror 1 and the torsion bar 2b. Also, provided on the rear surface of the mirror 1 is a reinforcement rib 7 formed by a ring-shaped central portion 71, extension portions 7a-1 and 7a-2 extended symmetrically from the ring-shaped central portion 71 on the side of the torsion bar 2a, and extension portions 7b-1 and 7b-2 extended symmetrically from the ring-shaped central portion 71 on the side of the torsion bar 2b. In this case, the size (i.e., radius) of the ring-shaped central portion 71 is smaller than that of the mirror 1. Also, the ring-shaped central portion 71 can be circular or elliptical. Further, the extension portions 7a-1 and 7a-2 are coupled to the protruded portions 2a-1 and 2a-2, respectively, of the torsion bar 2a, and the extension portions 7b-1 and 7b-2 of the torsion bar 2b are coupled to the protruded portions 2b-1 and 2b-2, respectively, of the torsion bar 2b.

Figure 2C:
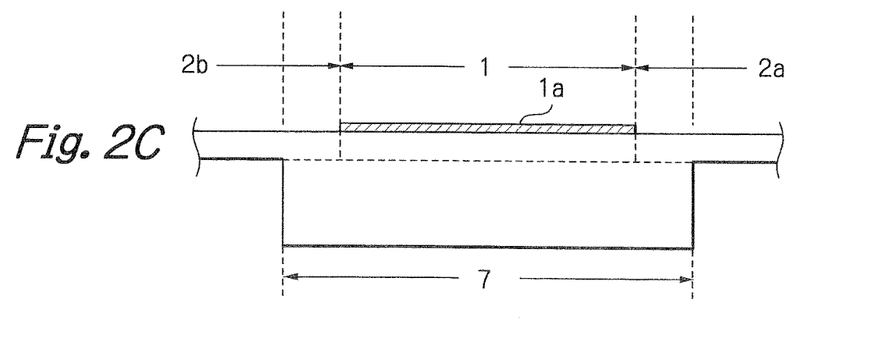
Figure 3:
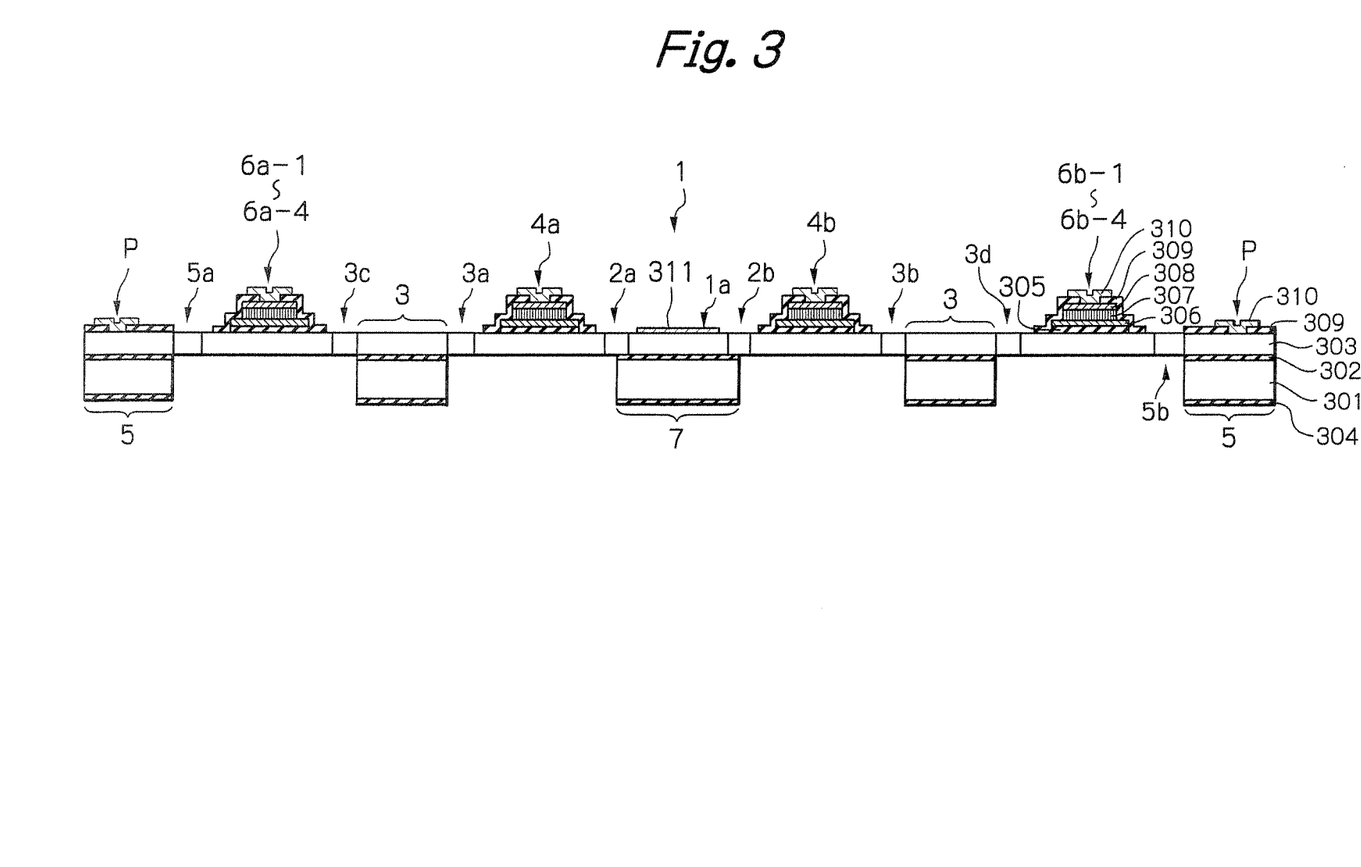
FIG. 3 is a cross-sectional view of the optical deflector of FIG. 1.

In FIGS. 2A and 2B, the mirror 1 is constructed by the monocrystalline silicon ("Device") layer 303 and the aluminum (Al) reflective layer 311 (see: FIG. 3); the torsion bars 2a and 2b along with the protruded portions 2a-1, 2a-2, 2b-1 and 2b-2 are constructed by the monocrystalline silicon ("Device") layer 303 (see: FIG. 3); and the reinforcement rib 7 as well as by the ring-shaped central portion 71, and the extension portions 7a-1, 7a-2, 7b-1 and 7b-2 are constructed by the monocrystalline silicon ("Handle") layer 301, the intermediate silicon dioxide ("Box") layer, the intermediate silicon dioxide ("Box") layer 302 and the silicon dioxide layer 304 (see: FIG. 3). However, the torsion bars 2a and 2b and the reinforcement rib 7 can be made of a single material substrate such as a monocrystalline silicon substrate as illustrated in FIG. 2C.

In more detail, the torsion bars 2a and 2b have ends coupled to the outer circumference of the mirror 1 and other ends coupled to the inner circumference of the inner frame 3. Therefore, the torsion bars 2a and 2b are twisted by the inner piezoelectric actuators 4a and 4b to rock the mirror 1 around the X-axis.

The outer frame 5 is rectangular-framed to surround the inner frame 3 associated with the meander-type outer piezoelectric actuators 6a and 6b.

The meander-type outer piezoelectric actuator 6a is constructed by piezoelectric cantilevers 6a-1, 6a-2, 6a-3 and 6a-4 which are serially-coupled from the coupling portion 5a of the outer frame 5 to the coupling portion 2c of the inner frame 3. Also, each of the piezoelectric cantilevers 6a-1, 6a-2, 6a-3 and 6a-4 is in parallel with the X-axis. Therefore, the piezoelectric cantilevers 6a-1, 6a-2, 6a-3 and 6a-4 are folded at every cantilever or meandering from the outer frame 5 to the inner frame 3, so that the amplitudes of the piezoelectric cantilevers 6a-, 6a-2, 6a-3 and 6a-4 can be changed along directions perpendicular to the Y-axis.

Similarly, the meander-type outer piezoelectric actuator 6b is constructed by piezoelectric cantilevers 6b-1, 6b-2, 6b-3 and 6b-4 which are serially-coupled from the coupling portion 5b of the outer frame 5 to the outer coupling portion 2d of the inner frame 3. Also, each of the piezoelectric cantilevers 6b-1, 6b-2, 6b-3 and 6b-4 are in parallel with the X-axis. Therefore, the piezoelectric cantilevers 6b-1, 6b-2, 6b-3 and 6b-4 are folded at every cantilever or meandering from the outer frame 5 to the inner frame 3, so that the piezoelectric cantilevers 6b-1, 6b-2, 6b-3 and 6b-4 can be changed along directions perpendicular to the Y-axis.

In the outer piezoelectric actuators 6a and 6b, the piezoelectric cantilevers 6a-1, 6a-2, 6a-3, 6a-4, 6b-, 6b-2, 6b-3 and 6b-4 are divided into an odd-numbered group of the piezoelectric cantilevers 6a-1 and 6a-3; 6b-1 and 6b-3, and an even-numbered group of the piezoelectric cantilevers 6a-2 and 6a-4; 6b-2 and 6b-4 alternating with the odd-numbered group of the piezoelectric cantilevers 6a-1 and 6a-3; 6b-1 and 6b-3.

Provided on the outer frame 5 are pads P which are connected to the control unit 30. The control unit 30 applies a drive voltage $V_{X1}$ to the inner piezoelectric actuator 4a and applies a drive voltage $V_{X2}$ to the inner piezoelectric actuator 4b. The drive voltages $V_{X1}$ and $V_{X2}$ are sinusoidal, and the drive voltage $V_{X1}$ is opposite in phase to the drive voltage $V_{X2}$. For example, the frequency $f_X$ of the drive voltages $V_{X1}$ and $V_{X2}$ is one resonant frequency $f_r$ such as 25 kHz depending upon a resonant structure formed by the mirror 1, the torsion bars 2a and 2b and the inner piezoelectric actuators 4a and 4b. Thus, the mirror 1 is rocked around the X-axis. On the other hand, the control unit 30 applies a drive voltage $V_{Y1}$ to the odd-numbered piezoelectric cantilevers 6a-1, 6a-3, 6b-1 and 6b-3, and applies a drive voltage $V_{Y2}$ to the even-numbered piezoelectric cantilevers 6a-2, 6a-4, 6b-2 and 6b-4. The drive voltages $V_{Y1}$ and $V_{Y2}$ are sinusoidal or saw-tooth-shaped, and the drive voltage $V_{Y1}$ is opposite in phase to the drive voltage $V_{Y2}$. For example, the frequency $f_Y$ of the drive voltages $V_{Y1}$ and $V_{Y2}$ is 60 Hz, much lower than the resonant frequency $f_r$. Thus, the mirror 1 is rocked around the Y-axis.

The control unit 30 includes a microprocessor, a digital signal processor, or a field programmable gate array (FPGA).

A method for manufacturing the optical deflector 10 of FIG. 1 is explained next with reference to FIG. 3 which is a cross-sectional view of the optical deflector 10 of FIG. 1.

First, a silicon-on-insulator (SOI) structure constructed by a monocrystalline silicon support ("Handle") layer 301, an intermediate (buried) silicon dioxide ("Box") layer 302, and a monocrystalline silicon active ("Device") layer 303 is prepared. Also, by a thermal oxidation process, a silicon dioxide layer 304 is formed on the support layer 301, and a silicon dioxide layer 305 is formed on the active layer 303.

Next, piezoelectric actuators 4a and 4b and piezoelectric cantilevers 6a-1, 6a-2, 6a-3 and 6a-4; 6b-1, 6b-2, 6b-3 and 6b-4 are formed on silicon dioxide layer 305. That is, a Pt/Ti lower electrode layer 306 consisting of an about 50 nm thick Ti and an about 150 nm thick Pt on Ti is formed by a sputtering process. Then, an about 3 m thick PZT layer 307 is deposited on the lower electrode layer 306 by an are discharge reactive ion plating (ADRIP) process at a temperature of about 500° C. to 600° C. Then, an about 150 nm thick Ti upper electrode layer 308 is formed on the PZT layer 307 by a sputtering process.

Next, the upper electrode layer 308 and the PZT layer 307 are patterned by a photolithography and etching process. Then, the lower electrode layer 306 and the silicon dioxide layer 305 are patterned by a photolithography and etching process.

Next, an about 500 nm thick silicon dioxide interlayer 309 is formed on the entire surface by a plasma chemical vapor deposition (PCVD) process.

Next, contact holes are perforated in the silicon dioxide interlayer 309 by a photolithography and dry etching process. The contact holes correspond to the piezoelectric actuators 4a and 4b, the piezoelectric cantilevers 6a-1, 6a-2, 6a-3, 6a-4, 6b-1, 6b-2, 6b-3, 6b-4, and the pads P.

Next, wiring layers 310 made of AlCu (1% Cu) are formed by a photolithography process, a sputtering process, and a lift-off process. The wiring layers 310 are electrically connected between the upper electrode layers 308 of the piezoelectric actuators 4a and 4b, and the piezoelectric cantilevers 6a-1, 6a-2, 6a-3, 6a-4, 6b-1, 6b-2, 6b-3 and 6b-4 and their corresponding pads P.

Next, the silicon dioxide layer 304 is etched by a photolithography and dry etching process, so that the silicon dioxide layer 304 is left in an area corresponding to the inner frame 3, the outer frame 5 and the reinforcement rib 7.

Next, the support layer 301 is etched by a dry etching process using the silicon dioxide layer 304 as an etching mask. Then, the silicon dioxide layer 302 is etched by a wet etching process using the support layer 301 as an etching mask.

Finally, an aluminum (Al) reflective layer 311 is formed by an evaporation process on the active layer 303, and is patterned by a photolithography and etching process, thus completing the optical deflector.

Figure 4:
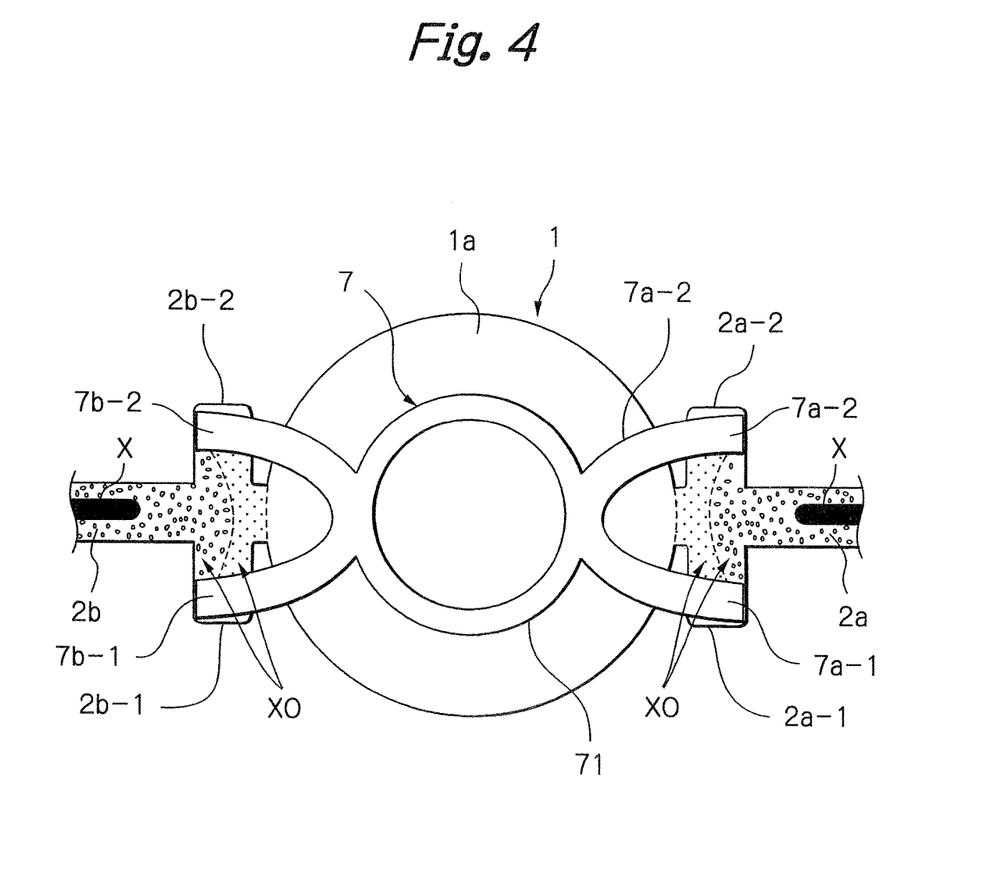
FIG. 4 is a rear-side view of the mirror and torsion bars of FIG. 1 with a simulated stress distribution.

When a simulation using the Oofelie-Multiphysics V4.4 (trademark) simulation software provided by Open Engineering was performed upon the optical deflector 10 of FIG. 1, a stress distribution as illustrated in FIG. 4 was obtained. In FIG. 4, the stronger stress, whether it is a compressive stress or a tensile stress, is shown darker in the illustration where a very large stress is indicated by X. In FIG. 4, a relatively large stress as indicated by X0 is concentrated at a portion of the torsion bar 2a (2b) in the vicinity of the protruded portions 2a-1 and 2a-2 (2b-1 and 2b-2), so that the spread of the relatively large stress is terminated approximately at a coupling portion between the torsion bar 2a (2b) and the mirror 1. Therefore, no substantial stress occurs in the portion of the mirror 1 surrounded by the extension portions 7a-1 and 7a-2 (7b-1 and 7b-2). Thus, the entire mirror 1 would not be distorted, so that the optical scanning characteristics of reflected light from the mirror 1 would improve. Additionally, the ring-shaped reinforcement rib 7 would not be peeled off.

On the other hand, in the first prior art optical deflector as illustrated in FIG. 5A, since the thickness of a mirror 101 is the same as that of torsion bars 102a and 102b, a relatively large stress as indicated by XA is spread isotropically and broadly into the mirror 101. As a result, the mirror 101 would be greatly deformed in a bowl shape. Also, in the second prior art optical deflector as illustrated in FIG. 5B, a ring-shaped reinforcement rib 103 is added to the rear-side of the mirror 101 of FIG. 5A, so that a relatively large stress indicated by XB is interrupted by the ring-shaped reinforcement rib 103. Thus, no substantial stress occurs in the mirror 101 within the ring-shaped reinforcement rib 103. Further, in the third prior art optical deflector as illustrated in FIG. 5C, protruded portions 101*a*-1, 101*a*-2, 101*b*-1 and 101*b*-2 are provided at the mirror 101, and extension portions 103*a*-1, 103*a*-2, 103*b*-1 and 103*b*-2 of the reinforcement rib 103 are coupled to the protruded portions 101*a*-1, 101*a*-2, 101*b*-1 and 101*b*-2, respectively, of the mirror 101, so that a relatively large stress indicated by XC is interrupted by the extension portions 103*a*-1, 103*a*-2, 103*b*-1 and 103*b*-2 of the reinforcement rib 103. In any of FIGS. 5A, 5B and 5C, however, the relatively large stress occurs in a part of the mirror 101, so that the part of the mirror 101 would be distorted. Thus, the optical scanning characteristics of reflected light from the mirror 101 would deteriorate. At worst, the ring-shaped reinforcement rib 103 of FIGS. 5B and 5C would be peeled off.

Figure 6A:
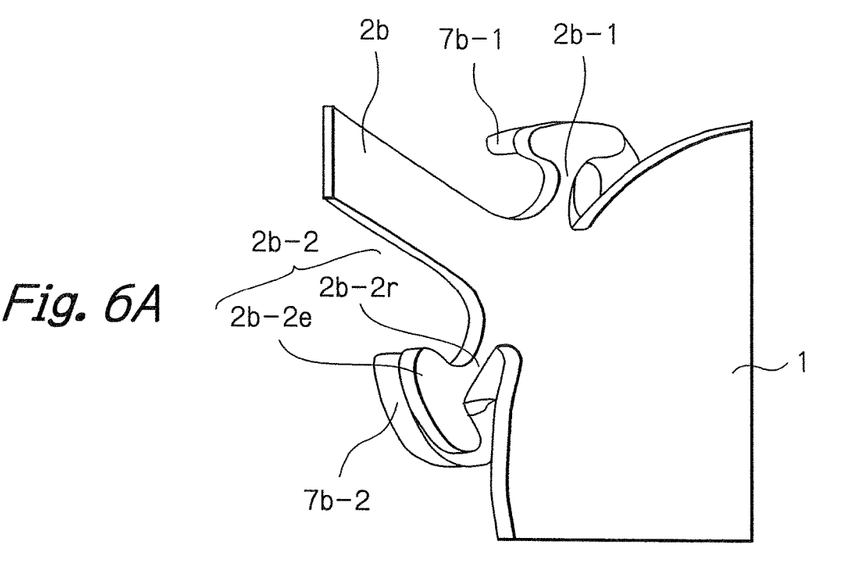
FIG. 6A is a detailed front-side view of the mirror and torsion bar of FIG. 1.
Figure 6B:
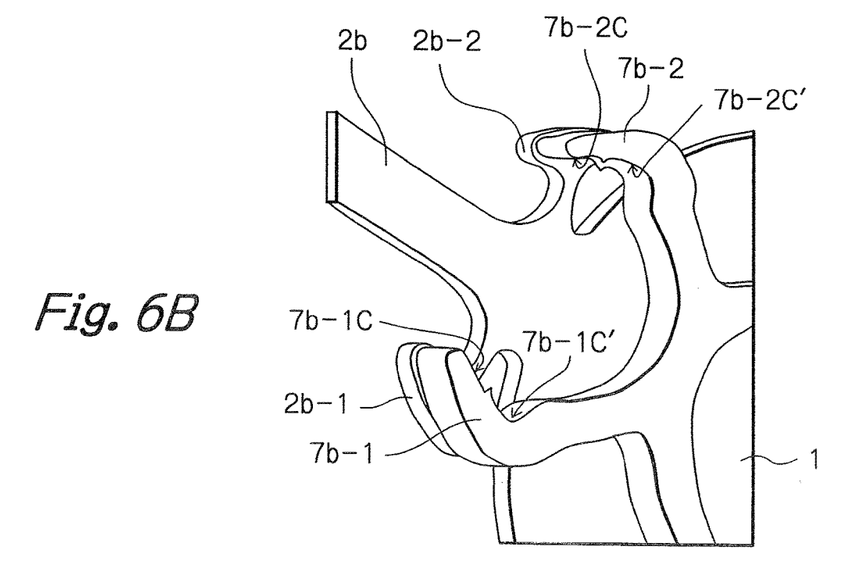
FIG. 6B is a detailed rear-side view of the mirror and torsion bar of FIG. 1.

FIG. 6A is a detailed front-side view of the mirror 1 and torsion bar 2*b* of FIG. 1, and FIG. 6B is a detailed rear-side view of the mirror 1 and torsion bar 2*b* of FIG. 1.

As illustrated in FIG. 6A, the protruded portions such as 2*b*-1 and 2*b*-2 have root portions 2*b*-1*r* and 2*b*-2*r* and end portions 2*b*-1*e* and 2*b*-2*e* wider than the root portions 2*b*-1*r* and 2*b*-2*r*. As a result, the extension portions 7*b*-1 and 7*b*-2 are surely coupled to the end portions 2*b*-1*e* and 2*b*-2*e*, respectively. However, the width of the protruded portions 2*b*-1 and 2*b*-2 can be uniformly wide as illustrated in FIG. 4.

As illustrated in FIG. 6B, the extension portion 7*b*-1 (7*b*-2) has a first concave (or inwardly-curved) portion 7*b*-2C toward the torsion bar 2*b* to which the extension portion 7*b*-1 (7*b*-2) is coupled, and a second concave (or inwardly-curved) portion 7*b*-1C' (7*b*-2C') toward the torsion bar 2*b* arranged between the protruded portion 2*b*-1 (2*b*-2) of the torsion bar 2*b* and the mirror 1.

Figure 7:
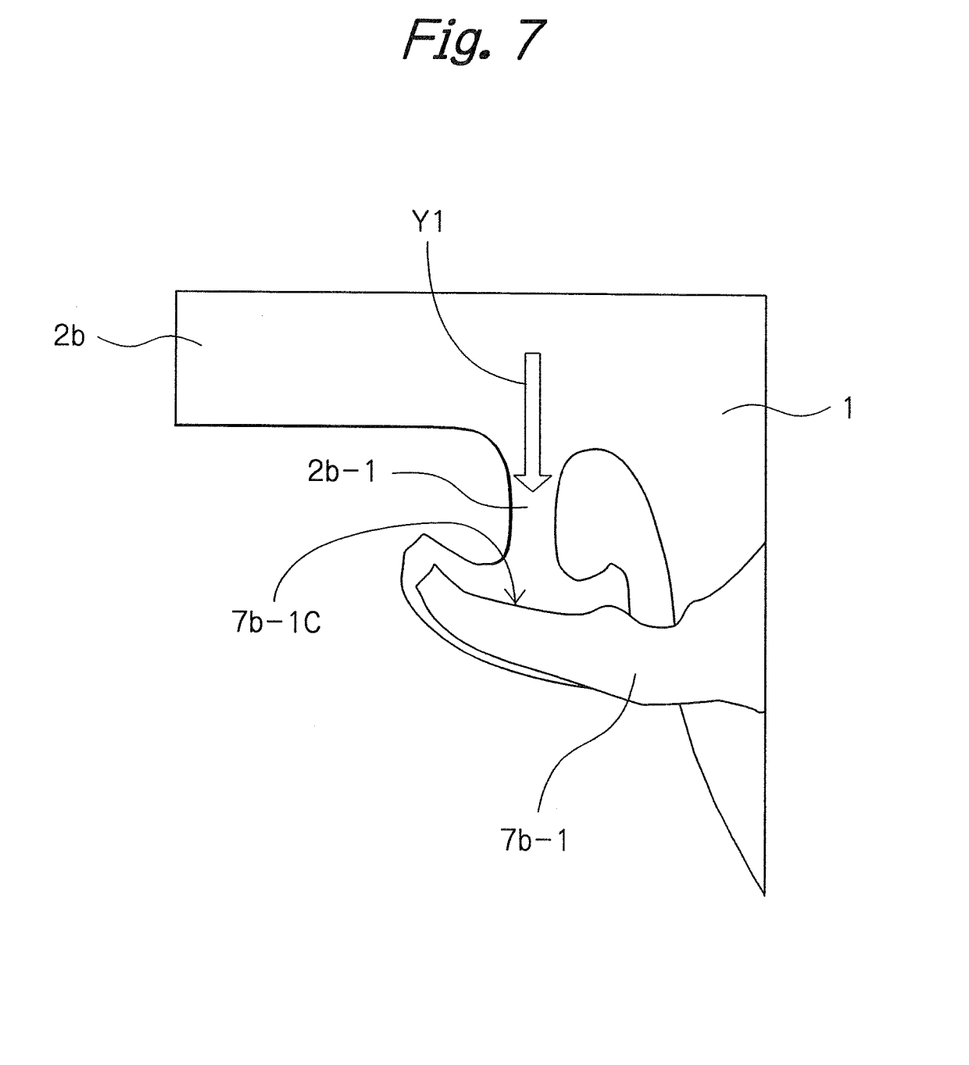
FIG. 7 is an enlarged view of the first inwardly-curved portion of the extension portion of FIG. 6B.

As illustrated in FIG. 7, which is an enlargement of the first inwardly-curved portion 7*b*-1C of the extension portion 7*b*-1 of FIG. 6B, when the torsion bar 2*b* is twisted, a stress as indicated by Y1 is spread from the torsion bar 2*b* through its protruded portion 2*b*-1 to the first inwardly-curved portion 7*b*-1C of the extension portion 7*b*-1. In this case, the stress indicated by Y1 would be relaxed by the first inwardly-curved portion 7*b*-1C, so that the extension portion 7*b*-1 would not be peeled off from the protruded portion 2*b*-1 at the first inwardly-curved portion 7*b*-1C.

Figure 8A:
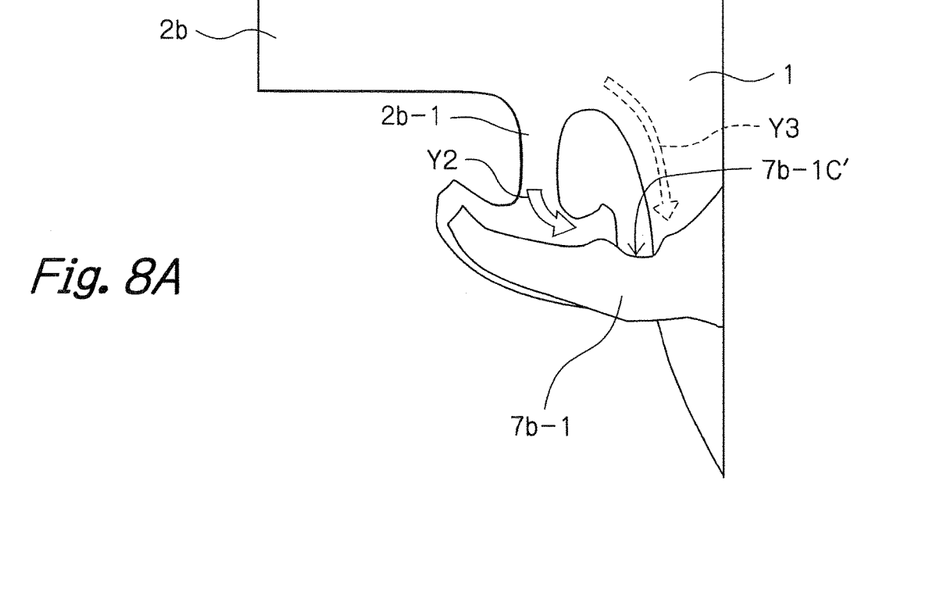
FIGS. 8A and 8B are enlarged views of the second inwardly-curved portion of the extension portion of FIG. 6B.
Figure 8B:
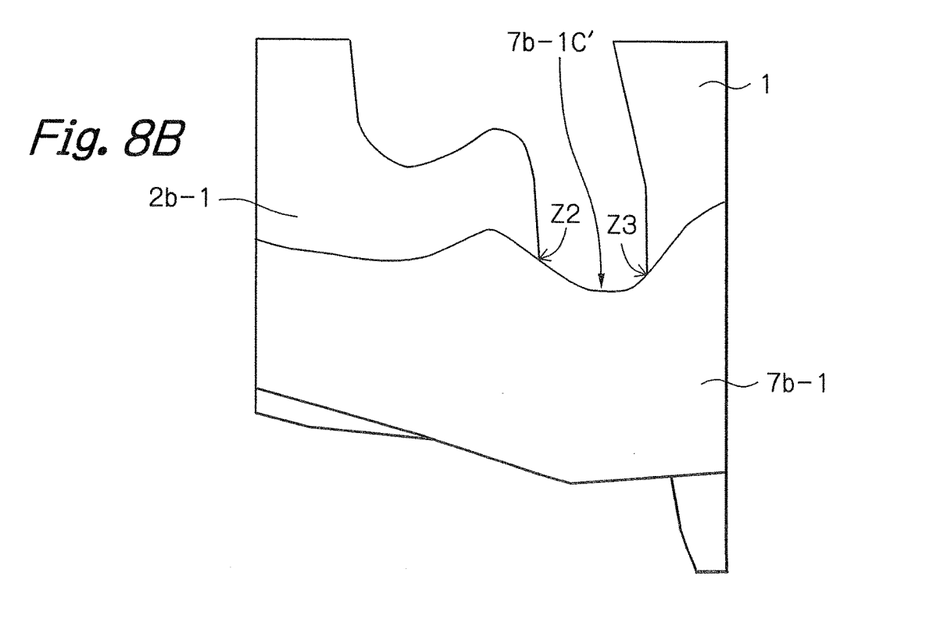

As illustrated in FIG. 8A, which is an enlargement of the second inwardly-curved portion 7*b*-1C' of the extension portion 7*b*-1 of FIG. 6B, when the torsion bar 2*b* is twisted, a stress as indicated by Y2 is spread from the torsion bar 2*b* through its protruded portion 2*b*-1 to the second inwardly-curved portion 7*b*-1C'. Also, a stress as indicated by Y3 is spread from the torsion bar 2*b* through the mirror 1 to the second inwardly-curved portion 7*b*-1C'. Note that the stress indicated by Y3 is much smaller than the stress indicated by Y2. In this case, the stresses indicated by Y2 and Y3 are relaxed by the second inwardly-curved portion 7*b*-1C'. As a result, as illustrated in FIG. 8B, which is a partial enlargement of FIG. 8A, the extension portion 7*b*-1 would not be peeled off at an external edge Z2 of the protruded portion 2*b*-1 coupling with the extension portion 7*b*-1 and at an external edge Z3 of the mirror 1 coupling with the extension portion 7*b*-1.

Figure 9A:
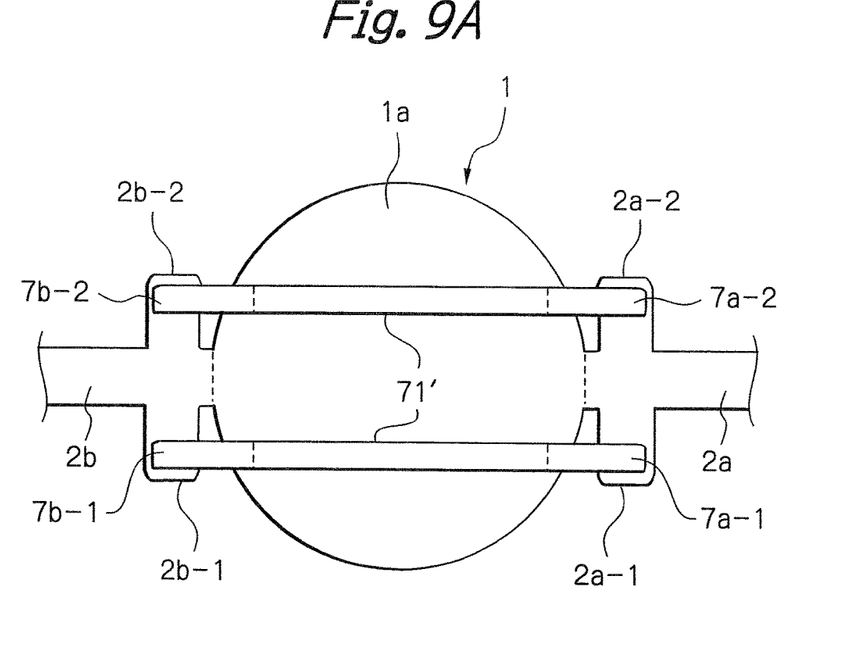
FIGS. 9A and 9B are rear-side views illustrating modifications of the mirror and torsion bar of FIG. 2A.
Figure 9B:
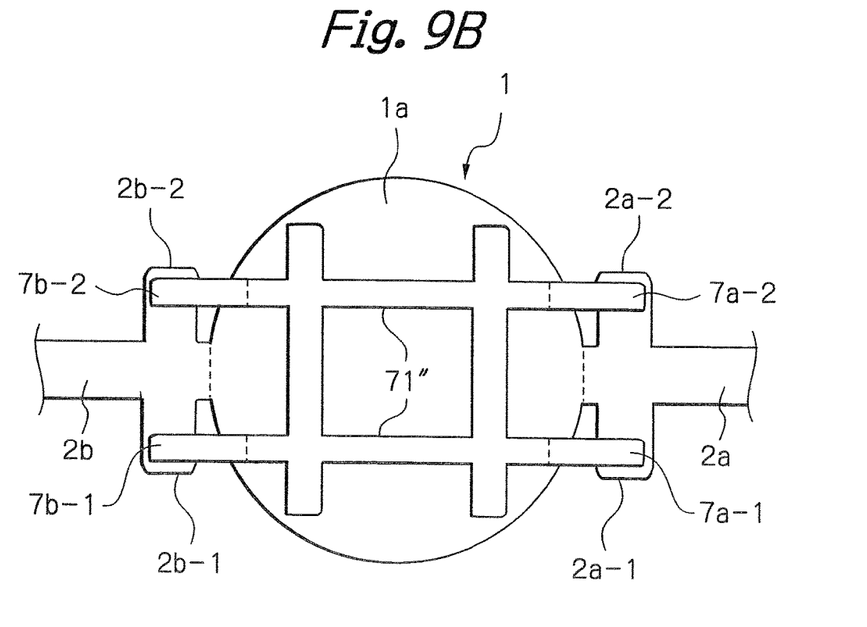

The ring-shaped central portion 71 of FIG. 2A can be modified into central portions 71' and 71" as illustrated in FIGS. 9A and 9B. In FIG. 9A, the central portions 71' is constructed by two parallel linear portions each with the extension portions 7*a*-1 and 7*a*-2 and the extension portions 7*b*-1 and 7*b*-2. In FIG. 9B, the central portions 71" is constructed by a well crib portion whose four ends are connected to the extension portions 7*a*-1, 7*a*-2, 7*b*-1 and 7*b*-2.

In FIG. 1, instead of the meander-type piezoelectric actuators 6*a* and 6*b*, a pair of outer torsion bars can be coupled between the outer support frame 5 and the inner support frame 3, and two pairs of piezoelectric actuators can be coupled between the outer support frame 5 and the outer torsion bars to rock the inner support frame 3 through the outer torsion bars along the Y-axis.

Also, the two-dimensional optical deflector of FIG. 1 can be applied to a one-dimensional optical deflector where the outer support frame 5 and the actuators 6*a* and 6*b* are removed.

Further, in the above-described embodiment, only one torsion bar can be provided instead of the pair of torsion bars 2*a* and 2*b* for rocking the mirror 1 around the X-axis. Similarly, only one meander-type actuator or only one outer torsion bar can be provided instead of the pair of meander-type actuators 6*a* and 6*b* or the pair of outer torsion bars.

Furthermore, in the above-described embodiment, electrostatic actuators or electromagnetic actuators can be provided instead of the piezoelectric actuators.

It will be apparent to those skilled in the art that various modifications and variations can be made in the presently disclosed subject matter without departing from the spirit or scope of the presently disclosed subject matter. Thus, it is intended that the presently disclosed subject matter covers the modifications and variations of the presently disclosed subject matter provided they come within the scope of the appended claims and their equivalents. All related or prior art references described above and in the Background section of the present specification are hereby incorporated in their entirety by reference.

The invention claimed is:

1. An optical deflector comprising:
    a mirror with a reflective layer on its front-side surface;
    a first support frame adapted to support said mirror;
    at least one torsion bar coupled between said first support frame and said mirror, said torsion bar having a pair of protruded portions arranged symmetrically with respect to said torsion bar in the vicinity of a coupling portion between said torsion bar and said mirror; and
    a reinforcement rib provided on a rear-side surface of said mirror, said reinforcement rib having a central portion and a pair of extension portions extended symmetrically from said central portion and coupled to said protruded portions, respectively.

2. The optical deflector as set forth in claim 1, wherein said extension portions have first inwardly-curved portions toward said torsion bar coupled to said protruded portions.

3. The optical deflector as set forth in claim 1, wherein said extension portions have second inwardly-curved portions toward said torsion bar arranged between said protruded portions and said mirror.

4. The optical deflector as set forth in claim 1, wherein said central portion comprises a ring-shaped portion with a size smaller than a size of said mirror.

5. The optical deflector as set forth in claim 1, wherein said central portion comprises two parallel linear portions arranged symmetrically with respect to said torsion bar.

6. The optical deflector as set forth in claim 1, wherein said central portion comprises a well crib portion.

7. The optical deflector as set forth in claim 1, wherein each of said protruded portions comprises a root portion and an end portion wider than said root portion coupled to a respective one of said extension portions.

8. The optical deflector as set forth in claim 1, further comprising:
a first actuator, coupled between said first support frame and said torsion bar, to rock said mirror around said torsion bar.

9. The optical deflector as set forth in claim 8, further comprising:
a second support frame to support said first support frame; and
at least one second actuator, coupled between said second support frame and said first support frame, to rock said first support frame around an axis perpendicular to said torsion bar.

10. The optical deflector as set forth in claim 9, wherein said second actuator comprises a meander-type actuator.

* * * * *